US008797726B2

(12) United States Patent
Chao

(10) Patent No.: US 8,797,726 B2
(45) Date of Patent: Aug. 5, 2014

(54) ELECTRONIC APPARATUS

(75) Inventor: Ya-Shin Chao, Taichung (TW)

(73) Assignee: Asia Optical International Ltd., Tortola (VG)

( * ) Notice: Subject to any disclaimer, the term of this patent is extended or adjusted under 35 U.S.C. 154(b) by 238 days.

(21) Appl. No.: 13/525,361

(22) Filed: Jun. 18, 2012

(65) Prior Publication Data

US 2013/0141853 A1 Jun. 6, 2013

(30) Foreign Application Priority Data

Dec. 5, 2011 (TW) ............................ 100144638 A

(51) Int. Cl.
*G06F 1/16* (2006.01)

(52) U.S. Cl.
USPC .................. 361/679.02; 345/174; 348/220.1; 455/575.8

(58) Field of Classification Search
CPC ........................................................ G06F 1/16
USPC ....................... 312/223.1, 223.2, 223.3, 326; 455/426.1, 575.1, 575.3, 90.2, 420, 455/566, 414.1, 411, 558, 575.8, 425; 348/360, 500, 559, 208.1, 445, 220.1; 345/173, 520, 103, 156, 172, 167, 158, 345/633, 168, 419, 174, 169; 361/679.01, 361/679.31, 679.4, 679.02, 679.41, 679.55, 361/679.42, 679.26, 679.15, 679.56, 361/679.17, 679, 21, 679.37, 679.13, 361/679.22, 679.27, 679.09
See application file for complete search history.

(56) References Cited

U.S. PATENT DOCUMENTS

| | | | | |
|---|---|---|---|---|
| 5,408,384 | A * | 4/1995 | Gannyo et al. | 361/737 |
| 5,481,432 | A * | 1/1996 | Tsukada et al. | 361/679.33 |
| 6,628,506 | B2 * | 9/2003 | Landry et al. | 361/679.27 |

FOREIGN PATENT DOCUMENTS

| | | |
|---|---|---|
| TW | 200712983 | 4/2007 |
| TW | 200911089 | 3/2009 |
| TW | M376803 | 3/2010 |
| TW | I331005 | 9/2010 |

OTHER PUBLICATIONS

"Office Action of Taiwan Counterpart Application", issued on Apr. 25, 2014, p.1-7.

* cited by examiner

*Primary Examiner* — Hung Duong
(74) *Attorney, Agent, or Firm* — Jianq Chyun IP Office

(57) ABSTRACT

An electronic apparatus including a main body and a detachable input device is provided. The main body has a first connecting interface. The detachable input device has an input interface and a second connecting interface. When the detachable input device is installed on the main body, the first connecting interface contacts the second connecting interface, and the detachable input device transmits signals to the main body through the first connecting interface and the second connecting interface, and receives electric power from the main body through the first connecting interface and the second connecting interface. When the detachable input device is detached from the main body, the first connecting interface is separate from the second connecting interface, and the detachable input device transmits signals to the main body in a wireless manner.

10 Claims, 4 Drawing Sheets

ELECTRONIC APPARATUS

CROSS-REFERENCE TO RELATED APPLICATION

This application claims the priority benefit of Taiwan application serial no. 100144638, filed on Dec. 5, 2011. The entirety of the above-mentioned patent application is hereby incorporated by reference herein and made a part of this specification.

BACKGROUND OF THE INVENTION

1. Field of the Invention

The present invention relates to an electronic apparatus. More particularly, the present invention relates to an electronic apparatus having a detachable input device.

2. Description of Related Art

Projectors have been widely applied in home theaters, activities of reference report and the like. In order that users can smoothly and conveniently watch the media files or reference reports during the meetings, most of projectors are provided with remote controls, so that the users can remotely control the projectors. In addition, as for electronic apparatuses such as televisions, multi-media players or the like, remote controls are also provided to improve the application convenience of the electronic apparatuses.

In general, most of the electronic apparatuses may already have input interfaces (such as keys) disposed therein for operating, but when the user is away from the electronic apparatus, the remote control can be replaced the input interface for remotely control the electronic apparatus. In other words, the remote control and the input interface of the electronic apparatus may not be simultaneously operated, and only one of them may be selected to be operated, and it may lead to increase the manufacturing cost and cause the repetition of functions. Besides, if there are external noise interferences, or the wireless transmitting component of the remote control is damaged, or the wireless receiving component of the electronic apparatus is damaged, then the remote control which only has the function of transmitting signals in a wireless manner may fail to perform. Furthermore, most of the remote controls are provided the required electric power by batteries, thus if the electric power is running out and under the condition of being unable to charge the battery, the remote control can no longer be used and it causes application inconvenience.

SUMMARY OF THE INVENTION

The present invention provides an electronic apparatus capable to reduce the manufacturing cost and improve the application convenience.

The present invention provides an electronic apparatus including a main body and a detachable input device. The main body has a first connecting interface. The detachable input device has an input interface and a second connecting interface. When the detachable input device is installed on the main body, the first connecting interface contacts the second connecting interface, and the detachable input device transmits signals to the main body through the first connecting interface and the second connecting interface, and the detachable input device receives an electric power from the main body through the first connecting interface and the second connecting interface. When the detachable input device is detached from the main body, the first connecting interface is separate from the second connecting interface, and the detachable input device transmits signals to the main body in a wireless manner.

In an exemplary embodiment of the present invention, the main body is a projector.

In an exemplary embodiment of the present invention, the input interface includes a plurality of keys.

In an exemplary embodiment of the present invention, the first connecting interface includes a first signal terminal, and the second connecting interface includes a second signal terminal. When the detachable input device is installed on the main body, the first signal terminal contacts the second signal terminal, and the detachable input device transmits signals to the main body through the first signal terminal and the second signal terminal.

In an exemplary embodiment of the present invention, the first connecting interface includes a first charging terminal, and the second connecting interface includes a second charging terminal. When the detachable input device is installed on the main body, the first charging terminal contacts the second charging terminal, and the detachable input device receives an electric power from the main body through the first charging terminal and the second charging terminal.

In an exemplary embodiment of the present invention, when the first connecting interface is separate from the second connecting interface, the detachable input device transmits signals to the main body in an infrared ray (IR) transmission manner.

In an exemplary embodiment of the present invention, the main body has a signal receiving module, and the first connecting interface includes a sensing terminal. The sensing terminal is electrically connected to the signal receiving module. When the detachable input device is installed on the main body, the second connecting interface contacts the sensing terminal, and the signal receiving module is adapted to receive a signal having a first code. When the detachable input device is detached from the main body, the sensing terminal is separate from the second connecting interface, and the signal receiving module is switched to receive a signal having a second code.

In an exemplary embodiment of the present invention, the main body has a wireless receiving component, and the detachable input device has a wireless transmitting component. When the first connecting interface is separate from the second connecting interface, the detachable input device transmits signals to the wireless receiving component through the wireless transmitting component.

In an exemplary embodiment of the present invention, the main body has a recess, and the first connecting interface is located in the recess. The detachable input device is adapted to be installed in the recess, so that the first connecting interface contacts the second connecting interface.

In an exemplary embodiment of the present invention, two opposite inner walls of the recess forms a sliding track, and the detachable input device is adapted to slide into the recess via the sliding track.

In an exemplary embodiment of the present invention, the detachable input device has a status-indicating light. When the electric power of the detachable input device is insufficient, the status-indicating light is switched on.

In light of the above, the detachable input device of the embodiment of the present invention is capable of inputting signals in a wireless manner to the main body of the electronic apparatus for remotely control. The detachable input device can also be installed on the main body for inputting signals through the contact between the first connecting interface and the second connecting interface. In other words, when the detachable input device is separate from the main body of the electronic apparatus, the user can remotely control the main body by using the input interface of the detachable input device. And when the detachable input device is installed on the main body, the input interface of the detachable input device is integrated into the main body. Accordingly, the main body is unnecessary to have an input interface fixedly disposed therein, thus the manufacturing cost can be reduced. In addition, when there are external noise interferences or other causes result in the detachable input device being incapable of transmitting signals in a wireless manner, the detachable input device still can transmit signals to the main body through the first connecting interface and the second connecting interface in a non-wireless manner, so as to enhance the operating flexibility and convenience. Moreover, in addition to the main body can receive signals from the detachable input device through the first connecting interface and the second connecting interface, the main body is also capable of charging the detachable input device through the first connecting interface and the second connecting interface, so that the detachable input device needs not to rely on batteries for providing electric power. Furthermore, since the first connecting interface and the second connecting interface have both the functions of signal inputting and charging, charging interface is not required to be additionally disposed, and thus the internal space can be saved.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
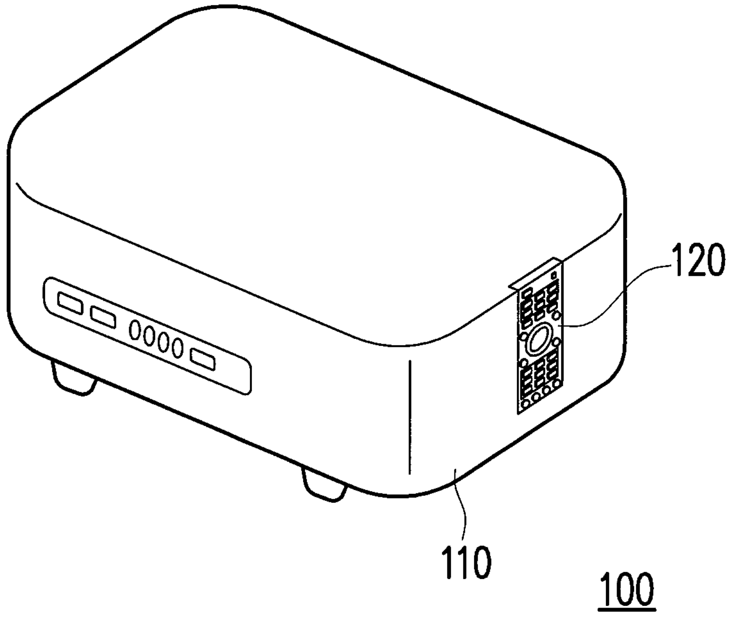
FIG. 1 schematically illustrates a perspective view of an electronic apparatus according to one embodiment of the present invention.
Figure 2:
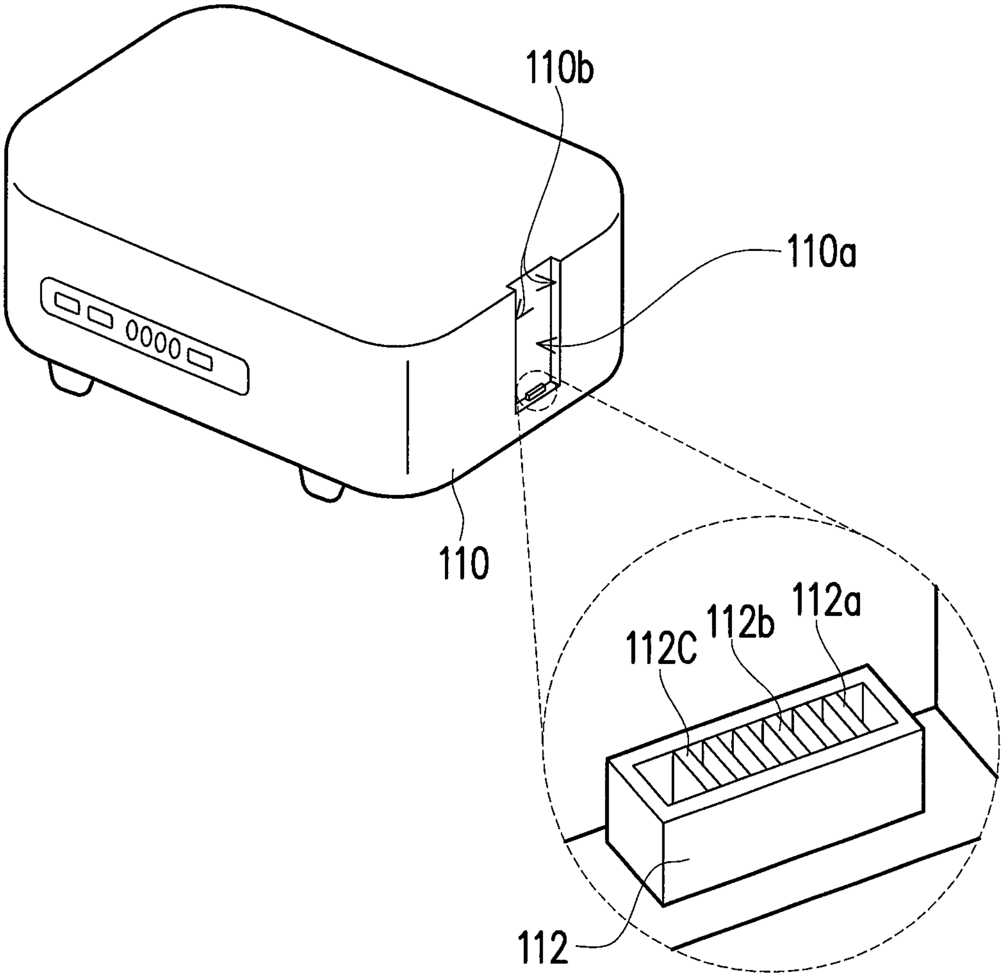
FIG. 2 schematically shows a perspective view of the main body in FIG. 1.
Figure 3:
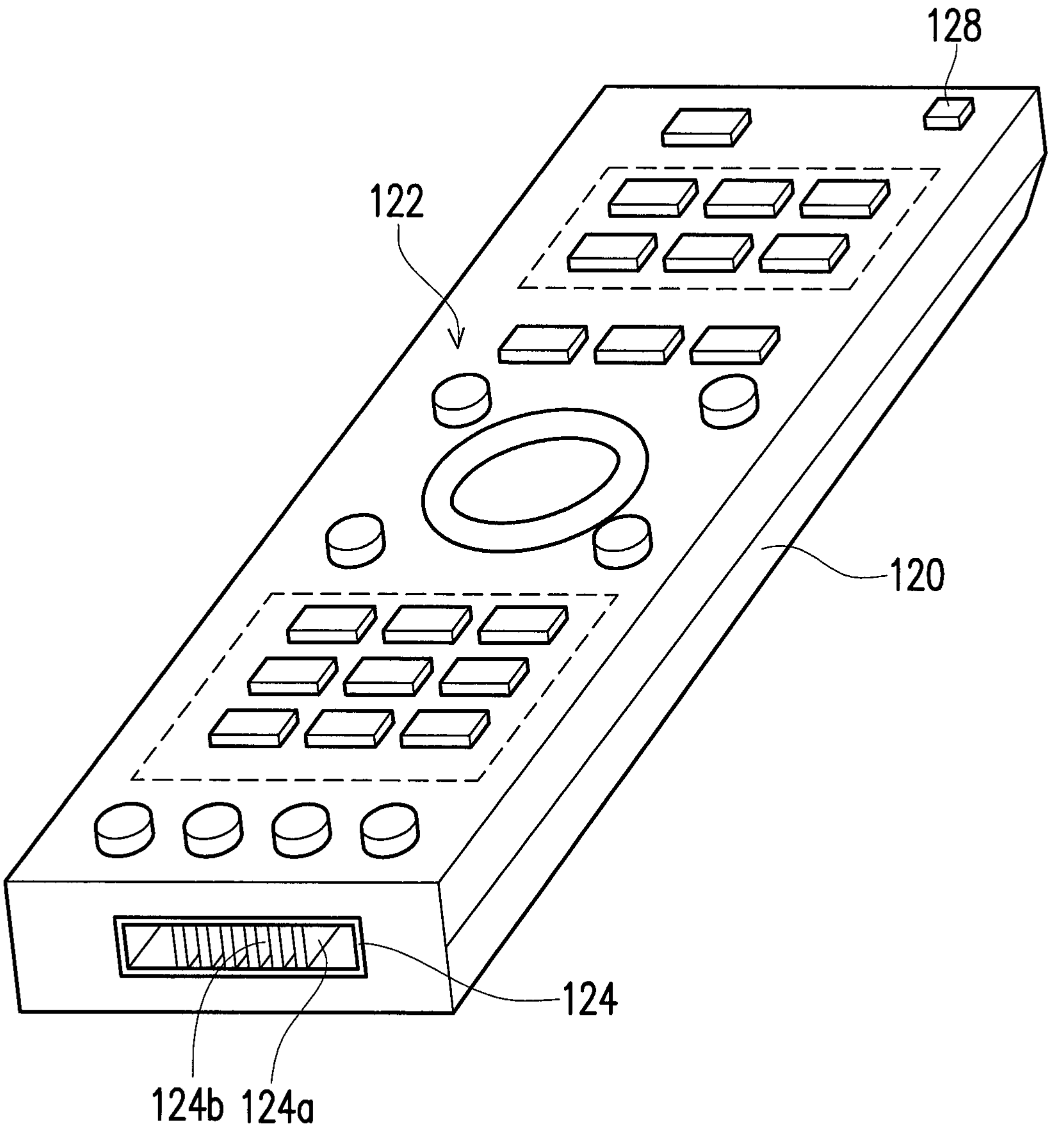
FIG. 3 schematically shows a perspective view of the detachable input device in FIG. 1.

FIG. 1 schematically illustrates a perspective view of an electronic apparatus according to one embodiment of the present invention. FIG. 2 schematically shows a perspective view of the main body in FIG. 1. FIG. 3 schematically shows a perspective view of the detachable input device in FIG. 1. Referring to FIG. 1 to FIG. 3, the electronic apparatus 100 of the embodiment includes a main body 110 and a detachable input device 120. The main body 110 has a first connecting interface 112, and the detachable input device 120 has an input interface 122 (shown as keys) and a second connecting interface 124.

When the detachable input device 120 is installed on the main body 110 as shown in FIG. 1, the first connecting interface 112 shown in FIG. 2 contacts the second connecting interface 124 shown in FIG. 3, so that the detachable input device 120 transmits signals to the main body 110 through the first connecting interface 112 and the second connecting interface 124, and the detachable input device 120 receives an electric power from the main body 110 through the first connecting interface 112 and the second connecting interface 124. When the detachable input device 120 shown in FIG. 2 is detached from the main body 110 shown in FIG. 3, the first connecting interface 112 is separate from the second connecting interface 124, and at this time the detachable input device 120 transmits signals to the main body 110 in a wireless manner. The wireless manner is an infrared control technique or any other wireless control technique, but the present invention is not limited thereto.

In such configuration, in addition to the detachable input device 120 is capable of inputting signals in a wireless manner to the main body 110 of the electronic apparatus 100 for remotely control, the detachable input device 120 can also be installed on the main body 110 for inputting signals through the contact between the first connecting interface 112 and the second connecting interface 124. In other words, when the detachable input device 120 is separate from the main body 110 of the electronic apparatus 100, the user can remotely control the main body 110 by using the input interface 122 of the detachable input device 120. And when the detachable input device 120 is installed on the main body 110, the input interface 122 of the detachable input device 120 is integrated into the main body 110. Accordingly, the main body 110 is unnecessary to have an input interface fixedly disposed therein, thus the manufacturing cost can be reduced. In addition, when there are external noise interferences or other causes result in the detachable input device 120 being incapable of transmitting signals in a wireless manner, the detachable input device 120 still can transmit signals to the main body 110 through the first connecting interface 112 and the second connecting interface 124 in a non-wireless manner, so as to enhance the operating flexibility and convenience. Moreover, in addition to the main body 110 can receive signals from the detachable input device 120 through the first connecting interface 112 and the second connecting interface 124, the main body 110 is also capable of charging the detachable input device 120 through the first connecting interface 112 and the second connecting interface 124, so that the detachable input device 120 needs not to rely on batteries for providing electric power. Furthermore, since the first connecting interface 112 and the second connecting interface 124 have both the functions of signal inputting and charging, charging interface is not required to be additionally disposed, and thus the internal space can be saved.

In the present embodiment, the main body 110 is a projector, for example. When the main body 110 and the detachable input device 120 are separate from each other as shown in FIG. 2 and FIG. 3, the detachable input device 120 is like a remote control of a projector, and the user can press the keys of the input interface 122 to remotely control. When the main body 110 and the detachable input device 120 are combined together as shown in FIG. 1, the input interface 122 of the detachable input device 120 is integrated with the main body 110 and becomes a plurality of keys so that the user can press the keys for inputting. In other embodiments, the main body 110 can also be any other kinds of electronic devices, which should not be construed as a limitation to the invention.

Referring to FIG. 2 and FIG. 3, specifically, the first connecting interface 112 of the embodiment includes a first signal terminal 112*a* and a first charging terminal 112*b*, and the second connecting interface 124 includes a second signal terminal 124*a* and a second charging terminal 124*b*. When the detachable input device 120 is installed on the main body 110 as shown in FIG. 1, the first signal terminal 112*a* contacts the second signal terminal 124*a*, and the first charging terminal 112*b* contacts the second charging terminal 124*b*. At this time, the detachable input device 120 can transmit signals to the main body 110 through the first signal terminal 112*a* and the second signal terminal 124*a*, and receive an electric power from the main body 110 through the first charging terminal 112*b* and the second charging terminal 124*b*.

Figure 4:
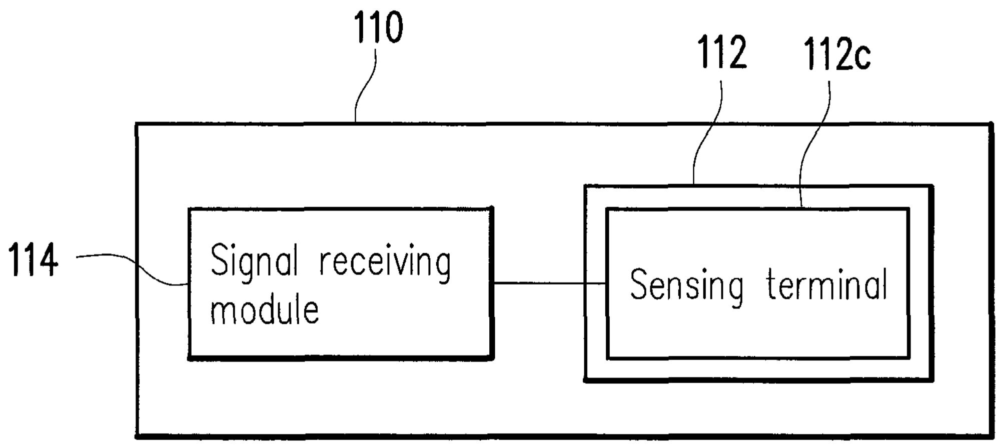
FIG. 4 shows a block diagram of the main body in FIG. 1.

FIG. 4 shows a block diagram of the main body in FIG. 1. Referring to FIG. 2 and FIG. 4, the main body 110 of the embodiment has a signal receiving module 114, and the first connecting interface 112 includes a sensing terminal 112*c*. The sensing terminal 112*c* is electrically connected to the signal receiving module 114. When the detachable input device 120 is installed on the main body 110 as shown in FIG. 1, the second connecting interface 124 of the detachable input device 120 contacts the sensing terminal 112*c*, and at this time, the signal receiving module 114 is adapted to receive a signal having a first code. When the detachable input device 120 is detached from the main body 110 as shown in FIG. 2 and FIG. 3, the sensing terminal 112*c* is separate from the second connecting interface 124, and the signal receiving module 114 is switched to receive a signal having a second code, wherein the first code is different from the second code. In other words, the signal receiving module 114 switches the signal into the kind of signal which is adapted to receive via the sensing terminal 112*c*. When the sensing terminal 112*c* contacts the second connecting interface 124, the signal receiving module 114 is adapted to receive the signal (having the first code) non-wirelessly transmitted by the detachable input device 120 through the first signal terminal 112*a* and the second signal terminal 124*a*. And when the sensing terminal 112*c* does not contact the second connecting interface 124, the signal receiving module 114 is adapted to receive the signal (having the second code) wirelessly transmitted by the detachable input device 120.

Figure 5:
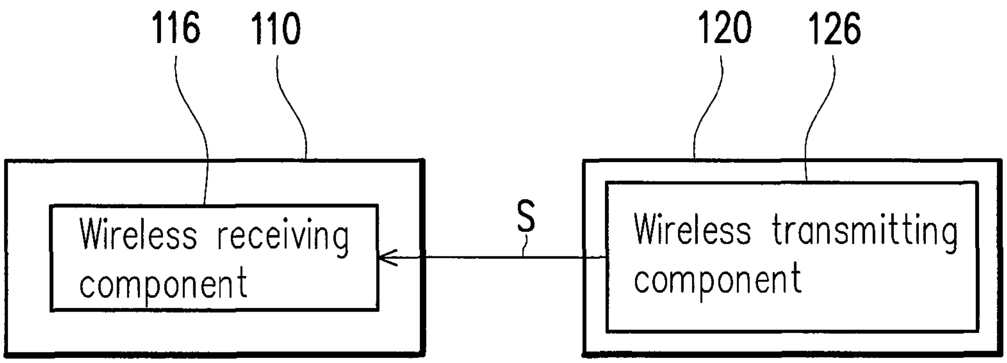
FIG. 5 is a block diagram showing that the main body in FIG. 2 receives wireless signals from the detachable input device in FIG. 3.

FIG. 5 is a block diagram showing that the main body in FIG. 2 receives wireless signals from the detachable input device in FIG. 3. Referring to FIG. 5, the main body 110 of the embodiment has a wireless receiving component 116, and the detachable input device 120 has a wireless transmitting component 126. When the first connecting interface 112 is separate from the second connecting interface 124 as shown in FIG. 2 and FIG. 3, the detachable input device 120 transmits a wireless signal S to the wireless receiving component 116 of the main body 110 through the wireless transmitting component 126. When the wireless receiving component 116 or the wireless transmitting component 126 malfunctions and the detachable input device 120 is disable to wirelessly transmit signals to the main body 110, the detachable input device 120 can be installed to the main body 110 as shown in FIG. 1 so that the detachable input device 120 transmits signals to the main body 110 in a non-wireless manner through the first connecting interface 112 and the second connecting interface 124. Accordingly, even though in the condition that the wireless receiving component 116 or the wireless transmitting component 126 malfunctions, the detachable input device 120 still has the capability to transmit signals to the main body 110.

Referring to FIG. 2, the main body 110 of the embodiment has a recess 110*a*, and the first connecting interface 112 is located in the recess 110*a*. The detachable input device 120 shown in FIG. 3 is adapted to be installed in the recess 110*a* and fixed on the main body 110 as shown in FIG. 1, so that the first connecting interface 112 contacts the second connecting interface 124. More specifically, two opposite inner walls 110*b* of the recess 110*a* form a sliding track, and the detachable input device 120 is adapted to slide into the recess 110*a* via the sliding track, so that the user can easily install the detachable input device 120.

Referring to FIG. 3, in the present embodiment, the detachable input device 120 further includes a status-indicating light 128. When the electric power of the detachable input device 120 is insufficient, the status-indicating light 128 is switched on, so that the user notes that the electric power of the detachable input device 120 is running out. At this time, the user can install the detachable input device 120 to the main body 110 as shown in FIG. 1, so that the first charging terminal 112*b* contacts the second charging terminal 124*b* and the detachable input device 120 receives the electric power provided by the main body 110 through the first charging terminal 112*b* and the second charging terminal 124*b*. The status-indicating light 128 uses a light emitting diode (LED) as a light source, for example, but the present invention is not limited thereto and in other embodiments the status-indicating light 128 may use any other sorts of light source.

In light of the foregoing, the detachable input device of the embodiment of the present invention is capable of inputting signals in a wireless manner to the main body of the electronic apparatus for remotely control. The detachable input device can also be installed on the main body for inputting signals through the contact between the first connecting interface and the second connecting interface. In other words, when the detachable input device is separate from the main body of the electronic apparatus, the user can remotely control the main body by using the input interface of the detachable input device. And when the detachable input device is installed on the main body, the input interface of the detachable input device is integrated into the main body. Accordingly, the main body is unnecessary to have an input interface fixedly disposed therein, thus the manufacturing cost can be reduced. In addition, when there are external noise interferences or other causes result in the detachable input device being incapable of transmitting signals in a wireless manner, the detachable input device still can transmit signals to the main body through the first connecting interface and the second connecting interface in a non-wireless manner, so as to enhance the operating flexibility and convenience. Moreover, in addition to the main body can receive signals from the detachable input device through the first connecting interface and the second connecting interface, the main body is also capable of charging the detachable input device through the first connecting interface and the second connecting interface, so that the detachable input device needs not to rely on batteries for providing electric power. Furthermore, since the first connecting interface and the second connecting interface have both the functions of signal inputting and charging, charging interface is not required to be additionally disposed, and thus the internal space can be saved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic apparatus, comprising:

a main body having a first connecting interface; and a detachable input device having an input interface and a second connecting interface, wherein when the detachable input device is installed on the main body, the first connecting interface contacts the second connecting interface, the detachable input device transmits signals to the main body through the first connecting interface and the second connecting interface, and the detachable input device receives an electric power from the main body through the first connecting interface and the second connecting interface, and when the detachable input device is detached from the main body, the first connecting interface is separate from the second connecting interface, and the detachable input device transmits signals to the main body in a wireless manner.

2. The electronic apparatus as claimed in claim 1, wherein the main body is a projector.

3. The electronic apparatus as claimed in claim 1, wherein the input interface comprises a plurality of keys.

4. The electronic apparatus as claimed in claim 1, wherein the first connecting interface comprises a first signal terminal, the second connecting interface comprises a second signal terminal, and when the detachable input device is installed on the main body, the first signal terminal contacts the second signal terminal, and the detachable input device transmits signals to the main body through the first signal terminal and the second signal terminal.

5. The electronic apparatus as claimed in claim 1, wherein the first connecting interface comprises a first charging terminal, the second connecting interface comprises a second charging terminal, and when the detachable input device is installed on the main body, the first charging terminal contacts the second charging terminal, and the detachable input device receives an electric power from the main body through the first charging terminal and the second charging terminal.

6. The electronic apparatus as claimed in claim 1, wherein when the first connecting interface is separate from the second connecting interface, the detachable input device transmits signals to the main body in an infrared ray (IR) transmission manner.

7. The electronic apparatus as claimed in claim 1, wherein the main body has a signal receiving module, the first connecting interface comprises a sensing terminal, the sensing terminal is electrically connected to the signal receiving module; when the detachable input device is installed on the main body, the second connecting interface contacts the sensing terminal, and the signal receiving module is adapted to receive a signal having a first code, and when the detachable input device is detached from the main body, the sensing terminal is separate from the second connecting interface, and the signal receiving module is switched to receive a signal having a second code.

8. The electronic apparatus as claimed in claim 1, wherein the main body has a wireless receiving component, the detachable input device has a wireless transmitting component, and when the first connecting interface is separate from the second connecting interface, the detachable input device transmits signals to the wireless receiving component through the wireless transmitting component.

9. The electronic apparatus as claimed in claim 1, wherein the main body has a recess, the first connecting interface is located in the recess, and the detachable input device is adapted to be installed in the recess, so that the first connecting interface contacts the second connecting interface.

10. The electronic apparatus as claimed in claim 9, wherein two opposite inner walls of the recess forms a sliding track, and the detachable input device is adapted to slide into the recess via the sliding track.

* * * * *